(12) United States Patent
Patton, III et al.

(10) Patent No.: US 6,417,979 B1
(45) Date of Patent: Jul. 9, 2002

(54) DISK DRIVE INCLUDING STRAIN TRANSDUCER FOR DETECTING MECHANICAL SHOCK

(75) Inventors: Charles R. Patton, III, Murrieta; Barry L. Klein, Trabuco Canyon, both of CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/177,898

(22) Filed: Oct. 23, 1998

(51) Int. Cl.[7] ............................................. G11B 21/02
(52) U.S. Cl. .......................................... 360/75; 360/69
(58) Field of Search .............................. 360/69, 75, 71, 360/60; 310/320, 340, 311, 328, 348

(56) References Cited

U.S. PATENT DOCUMENTS

| | | | |
|---|---|---|---|
| 4,862,298 A | * 8/1989 | Genheimer et al. | ........ 360/75 X |
| 4,868,447 A | * 9/1989 | Lee et al. | .................... 310/328 |
| 4,905,107 A | * 2/1990 | Klein | ........................... 360/75 |
| 5,235,472 A | 8/1993 | Smith | |
| 5,333,138 A | 7/1994 | Richards et al. | |
| 5,373,213 A | * 12/1994 | Smith | .......................... 310/355 |
| 5,521,772 A | 5/1996 | Lee et al. | |
| 5,654,840 A | 8/1997 | Patton et al. | |
| 5,856,895 A | * 1/1999 | Schaenzer et al. | ......... 360/75 X |

* cited by examiner

Primary Examiner—David Hudspeth
Assistant Examiner—K. Wong
(74) Attorney, Agent, or Firm—Milad G Shara, Esq.

(57) ABSTRACT

A disk drive includes a head disk assembly having a housing including a first surface area, and a strain transducer for producing a strain signal representing strain in the first surface area due to a mechanical shock on the disk drive. The strain transducer includes a first electrode, a second electrode, and a volume of piezosensitive material defining a second surface area. The piezosensitive material is disposed between the first electrode and the second electrode. The first surface area overlaps the second surface area. The strain transducer further includes means for securing the first electrode and the piezosensitive material to the first surface area such that the strain in the first surface area is replicated in the piezosensitive material. The disk drive includes means responsive to the strain signal for controlling a write operation in the disk drive.

4 Claims, 7 Drawing Sheets

DISK DRIVE INCLUDING STRAIN TRANSDUCER FOR DETECTING MECHANICAL SHOCK

BACKGROUND OF THE INVENTION

1. Field of the Invention

The invention relates generally to disk drives. More specifically, the invention relates to detection of mechanical shocks on disk drives.

2. Description of the Prior Art

A huge market exists for hard disk drives for mass-market host computer systems such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development to design and develop cost innovative hard disk drives to meet increasingly demanding customer requirements.

Each of numerous contemporary mass-market hard disk drive models provides relatively large capacity, often in excess of 1 gigabyte per drive. Nevertheless, there exists substantial competitive pressure to develop mass-market hard disk drives having even higher capacities. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, and high capacity requires a design that provides high format efficiency and high areal storage density. Format efficiency relates to the percentage of available area that is available for storing user data rather than being consumed by control data, gaps, etc. Areal storage density relates to the amount of data storage capacity per unit of area on the recording surfaces of the disks. The available areal density may be determined from the product of the track density measured radially and the linear bit density measured along the tracks.

The available track density depends on numerous factors including the performance capability of a servo system in the hard disk drive which, among other things, provides for track following, i.e., maintaining alignment of a reading or writing transducer with respect to the centerline of a desired track. One type of servo system, sometimes referred to as an "embedded servo" employs servo data on the same disk surface that stores user data to provide signals employed in the operation of the servo system. An embedded servo format for the disk surface has the basic characteristic of a plurality of radially-extending servo-data regions (sometimes referred to as "servo wedges") and an interspersed plurality of radially-extending user-data regions. Each user-data region has a plurality of user-data track segments, and each servo-data region has a plurality of servo-data track segments.

In accord with another element of an embedded servo format, the servo data include track-identification data used during track-seeking operations, and burst data used during track-following operations. While data are being read in operation of an embedded servo hard disk drive, a transducer head produces a time-multiplexed analog read signal that during a revolution of the disk represents servo data during each of a first set of time intervals; and represents user data during each of a second set of time intervals.

The servo system moves the transducer head toward a desired track during a coarse "seek" mode using the track ID field as a control input. Once the transducer head is generally over the desired track, the servo system uses the servo bursts to keep the transducer head over that track in a fine "track follow" mode.

The track has a track pitch corresponding to 1/tpi, where tpi represents tracks per inch (track density). In the fine track follow mode, the servo bursts provide position error information representing the displacement of the transducer head relative to a centerline on the track. Servo electronics process the position error information to determine if the transducer head is either on-track or off-track. If the position error information indicates the transducer head is displaced more than a selected percentage (such as 10%) of the track pitch from the centerline, the servo electronics indicate an off-track condition and inhibits the transducer head from writing data to prevent overwriting an adjacent track. If the position error information indicates the transducer head is within the selected percentage of the track pitch from the centerline, the servo electronics indicate an on-track condition and the transducer head is permitted to write data in the user-data region.

A mechanical shock exerted on the disk drive can cause relative movement (rapid displacement) between the transducer head and track that exceeds the selected percentage of the track pitch from the centerline while the transducer head is writing data in the user-data region. Such a mechanical shock may cause the transducer head to overwrite an adjacent track. For example, the transducer head reads the servo data in the servo-data track segment and indicates an on-track condition. However, a mechanical shock exerted on the disk drive causes strain in the head disk assembly that propagates through the head disk assembly to cause relative movement (displacement) between the transducer head and the track that exceeds the selected percentage of the track pitch while the transducer head is writing data on the disk.

The mechanical shock can be produced from internal or external forces that act on the disk drive. For example, spindle motor vibration can produce an internal force on the disk drive. The environment in which the disk drive is operating can produce an external force on the disk drive. Both the external force and the internal force cause a mechanical shock on the disk drive that results in strain in the head disk assembly. Strain is a function of mechanical shock on the disk drive. The greater the mechanical shock (force on the disk drive), the greater the strain in the head disk assembly.

It is known to mount an accelerometer having piezoelectric material on a printed circuit board assembly that is mounted on the head disk assembly for sensing the mechanical shock exerted on the disk drive while the transducer head is writing data in a user-data track segment on the disk. A beam accelerometer can detect linear shocks along a single axis (unidirectional). Accordingly, more than one beam accelerometer is required for detecting linear shocks in the x,y,z axis, and rotational shocks in the planes corresponding to the x,y,z axis.

U.S. Pat. No. 5,333,138 (the "Richards Patent") discloses a mechanical shock sensor having single-beam and dual-beam cantilever beam accelerometers for measuring acceleration due to mechanical shock exerted on the disk drive. U.S. Pat. No. 5,235,472 (the "Smith Patent") discloses a mechanical shock sensor having piezoelectric material (to form an accelerometer) mounted on a printed circuit board in the disk drive to measure acceleration due to mechanical shock exerted on the disk drive.

The mechanical shock exerted on the disk drive propagates through the head disk assembly and mounting connections before reaching the accelerometer mounted on the printed circuit board assembly. The propagating shock wave causes strain in the beam accelerometer and the piezoelectric material generates a signal representing the detected mechanical shock exerted on the disk drive. If the detected mechanical shock exceeds a threshold, the transducer head is inhibited from writing data. However, a problem with mounting accelerometers on the printed circuited board assembly involves the delays associated with the shock wave reaching (propagating to) the printed circuit board assembly. Because the printed circuit board assembly is mounted to and is not as stiff as the head disk assembly, the printed circuit board assembly attenuates high frequency components of the shock wave. Furthermore, the printed circuit board assembly increases the time period for the shock wave to propagate to the accelerometer. Because of this delay, the shock may cause an off-track condition in the head disk assembly before the accelerometer mounted on the printed circuit board assembly detects the mechanical shock exceeding the threshold. If the mechanical shock is not detected in a timely manner, the transducer head may write on an adjacent track.

U.S. Pat. No. 5,521,772 (the "Lee patent") discloses mounting an acceleration rate sensor inside the head disk assembly. The acceleration rate sensor detects rate of change of angular and linear acceleration. The acceleration rate sensor includes spaced-apart piezoelectric transducers (PZT) and seismic mass plates attached to the PZTs. When a mechanical shock is exerted on the disk drive, the shock wave propagates from the head disk assembly to the acceleration rate sensor and causes movement of the PZTs. When the PZTs move, the seismic mass plates induce a stress in the PZTs. The magnitude of the strain depends on the movement of the PZTs. Thus, the mechanical shock on the disk drive is not detected until after the shock wave propagates to the acceleration rate sensor and the seismic mass plates induce strain in the PZTs. This can increase the time period for detecting the mechanical shock. Furthermore, purchasing and mounting the acceleration rate sensor inside the head disk assembly can add to the manufacturing cost.

There is a need for a cost effective technique that reduces the time for detecting and responding to a mechanical shock exerted on the disk drive.

SUMMARY OF THE INVENTION

The invention can be regarded as a disk drive being subject to a mechanical shock during a write operation in the disk drive. The disk drive includes a head disk assembly having a housing including a first surface area, and a strain transducer for producing a strain signal representing strain in the first surface area due to the mechanical shock. The strain transducer includes a first electrode, a second electrode, and a volume of piezosensitive material defining a second surface area. The piezosensitive material is disposed between the first electrode and the second electrode. The first surface area overlaps the second surface area. The strain transducer further includes means for securing the first electrode and the piezosensitive material to the first surface area such that the strain in the first surface area is replicated in the piezosensitive material. The disk drive includes means responsive to the strain signal for controlling the write operation in the disk drive.

DESCRIPTION OF THE PREFERRED EMBODIMENTS

Figure 1:
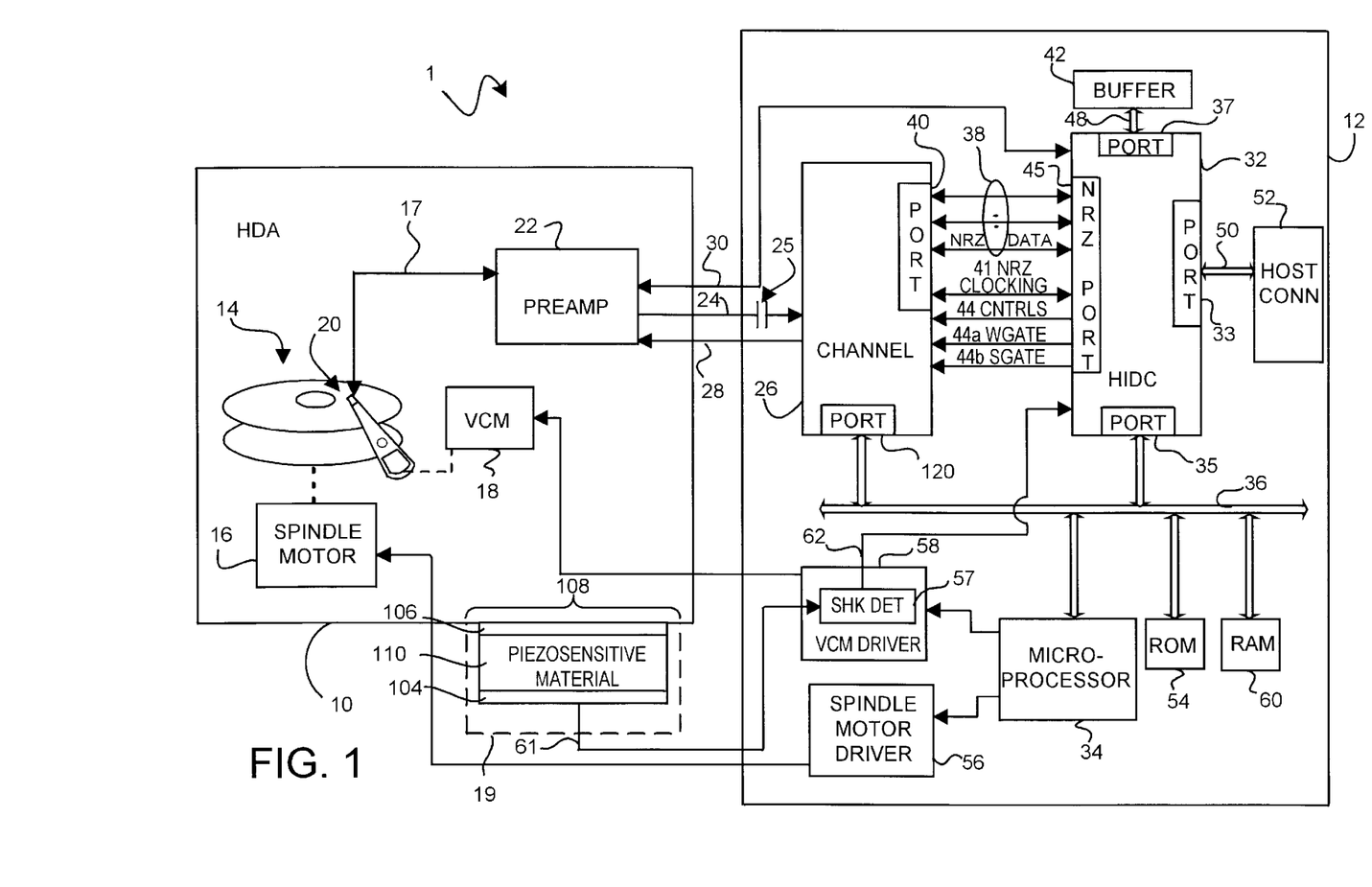
FIG. 1 is a block diagram of a disk drive including a printed circuit board assembly, a head disk assembly, and a strain transducer according to a preferred embodiment of the present invention for generating a strain signal representing strain in the head disk assembly due to mechanical shock exerted on the disk drive.

Referring to FIG. 1, a hard disk drive 1 in accordance with a preferred embodiment of the invention includes a head disk assembly ("HDA") 10 and a printed circuit board assembly ("PCBA") 12.

HDA 10 includes a set of disks 14 having recording surfaces. HDA 10 also includes two motors, i.e., spindle motor 16 and voice coil motor ("VCM") 18. Spindle motor 16 is mechanically coupled to cause disks 14 to rotate. VCM 18 is part of a head positioning servo system that controls the position, relative to an adjacent recording surface, of a set of transducer heads such as transducer head 20. Each transducer head provides for reading and writing, and may be of any of various types including inductive thin film and MR type heads. HDA 10 also includes a preamp 22 coupled between the heads and PCBA 12.

Suitably, disks 14 provide four recording surfaces. Each of the recording surfaces has a plurality of tracks arranged an embedded servo format. In an embedded servo format including the format employed in a preferred embodiment, there are provided interspersed servo-data regions and user-data regions; each servo-data region includes servo track segments for storing servo data and servo bursts, and each user-data region includes user track segments for storing user data. Each of a suitable number of transducers heads 20 provides for reading and writing with respect to a respective one of the recording surfaces of disks 14. Alternative embodiments may have more or fewer disks an/or transducer heads.

When reading, each transducer head 20 generates a low level analog read signal 17, which for inductive transducer heads and many MR heads is a differential signal. Analog read signal 17 is conveyed to signal inputs of preamp 22. Preamp 22 produces a read signal 24 which is an amplified, differential, analog read signal. HDA 10 also includes a path for conveying read signal 24 to PCBA 12; a path for conveying a write data signal 28 to preamp 22; and a path for conveying preamp control signals 30 for preamp 22. Under control of control signals 30, preamp 22 operates in either a read mode or a write mode and in either case communicates with a selected transducer head 20.

During a write operation, preamp 22 provides write current to a selected transducer head 20; the write current changes polarity upon each change in binary value of write data signal 28. Read signals 17 and 24 have the same information content, and both are subject to various kinds of distortions including linear distortions and nonlinear distortions.

PCBA 12 includes a channel 26 and a combined host interface and disk controller ("HIDC") 32, each of which preferably is implemented as a single IC. Channel 26 provides, among other things, a signal processing path for processing read signal 24 to produce a clocked, serial-by-symbol data signal (i.e., a decoded binary data signal and accompanying clock signal). In this art, such a signal processing path that processes an analog read signal produced by a preamplifier to produce such a clocked serial-by-symbol data signal is commonly called a "read channel." Channel 26 also provides a signal processing path for processing a clocked serial-by-symbol data signal provided by HIDC 32 to produce a serial-by-bit data signal for the analog signal input of preamp 22. In this art, such a signal processing path is commonly referred to as a "write channel." The serial-by-symbol data signals propagate between channel 26 and HIDC 32 via a channel data bus 38. The clock signals for the serial-by-symbol data signals are shown collectively as NRZ CLOCKING 41.

Channel 26 is coupled to receive read signal 24 through a set of coupling capacitors 25 and has a port 40 connected via bus 38 to an NRZ port 45 in HIDC 32. Ports 40 and 45 and interconnecting bus 38 propagate data in a clocked, serial-by-symbol form.

HIDC 32 performs numerous control functions for the disk drive including host interface functions to manage transfer of data between the disk drive and the host, and certain disk controller functions to manage the operation of channel 26 in writing and reading data. Incident to such certain disk controller functions, HIDC 32 has circuitry for producing certain timing and control signals that are part of a set identified collectively as timing and control signals 44 which are sent between channel 26 and HIDC 32. As part of timing and control signals 44, HIDC 32 sends to channel 26 one of a set of signals collectively identified as write gate signal 44a (WGATE) and one of a set of signals collectively identified as read gate signal 44b (RGATE).

PCBA 12 also includes a data buffer 42, a microprocessor 34, a read only memory ("ROM") 54, a writeable random access memory ("RAM") 60, a VCM driver 58 for supplying current to VCM 18, and a spindle motor driver 56 for supplying current to spindle motor 16. Suitably, VCM driver 58 includes a shock detection circuit 57 responsive to a strain signal 61 for generating a shock detect signal 62 when strain signal 61 exceeds a shock threshold. Alternatively, shock detection circuit 57 is external to VCM driver 58. PCBA 12 also includes a host interface bus 50 for conveying commands and data between HIDC 32 and the host connector 52 (connected to the host), a microprocessor bus 36, a buffer bus 48 for conveying data between HIDC 32 and data buffer 42, and a path for conveying control signals 30 that provide for bi-directional control interactions between preamp 22 and HIDC 32.

Microprocessor 34 executes instructions acquired from a stored control program to control disk drive functions. These functions include reading and decoding host commands, starting up and controlling the speed of spindle motor 16, minimizing head-positioning servo off track error through control of VCM 18, managing reduced power modes of operation, and other disk drive functions. Microprocessor 34 includes an I/O port that is connected to microprocessor bus 36.

Microprocessor 34 suitably has separate ports for directly communicating with spindle motor driver 56 and VCM driver 58. Channel 26 has a port 120 and HIDC 32 has a port 35 that connect to microprocessor bus 36, whereby microprocessor 34 is capable of communicating directly with either IC via microprocessor bus 36. Microprocessor bus 36 also enables microprocessor 34 to communicate directly with ROM 54, and RAM 60. In alternate embodiments, spindle motor driver 56 and VCM driver 58 may be connected to a single port or to microprocessor bus 36.

Suitably, microprocessor 34 provides commands to VCM driver 58 to control the position of transducer heads 20 over disks 14 at a target track for a subsequent execution of read or write commands. Microprocessor 34 receives a representative form of a position signal sensed by transducer head 20, via preamplifier 22 and channel 26, and performs calculations to position transducer head 20 relative to its associated disk surface. VCM driver 58 responds to commands from microprocessor 34 to provide a corresponding current to VCM 18. The current form VCM driver 57 is provided to VCM 18 and causes movement of transducer heads 20 over an associated disk surface of disks 14 to access a target data track.

Channel data bus 38 includes an 8-bit wide (byte-wide) parallel path; alternate embodiments may employ more or fewer parallel bits for channel data bus 38. Depending upon applicable data transfer requirements, a 4-bit wide (nibble-wide) path or even a serial-by-bit path may be suitable for channel data bus 38.

Preferably, channel 26 includes circuitry to accept write data from HIDC 32 via channel data bus 38 and port 40, to encode user write data for an appropriate RLL constraint and for partial response signaling precoding, and to produce write data signal 28 which is conveyed via preamp 22 to selected transducer head 20.

Channel 26 also includes circuitry to process read signal 24, and generate decoded digital user data. The decoded digital user data are conveyed to HIDC 32 via port 40, channel data bus 38, and HIDC NRZ port 45.

In addition to HIDC NRZ port 45, HIDC 32 includes a buffer port 37 connected to buffer bus 48, and host interface port 33 connected to host-interface bus 50. HIDC 32 includes a buffer manager-arbitrator circuit that manages access to data buffer 42 and manages bi-directional exchange of data between HIDC 32 and data buffer 42 via buffer bus 48. Host interface port 33 provides for communicating with the host via host interface bus 50 and host connection 52.

The host may be any electronic device that has an input/output (I/O) bus and interface connection means that is compatible with host connection 52, host interface bus 50 and host interface port 33.

Microprocessor 34 receives a command to position transducer head 20 for writing data on a specific target data track n on the disk surface of disk 14. In operation of disk drive 1, HIDC 32 keeps track of where transducer head 20 is circumferentially located over disk 14, and microprocessor 34 keeps track of which circular data track or "cylinder" of data tracks transducer 20 is over, and maintains timing and keeps transducer 20 tracking or following on the desired target data track.

The current circular data track position of transducer 20 is stored in RAM 60 to permit microprocessor 34 to determine a required seek distance between the current data track and a target data track on the disk surface of disk 14. Based on the required seek distance, microprocessor 34 retrieves a corresponding read or write seek profile from RAM 60 and provides a seek command to VCM driver 58 corresponding to the seek profile. VCM 58 provides a current output to VCM 18 for acceleration and/or deceleration of transducer 20 to perform a seek operation to move transducer head 20 from the current data track to the target data track.

As transducer head 20 moves from the current data track to the target data track, position information is received through the sensing of the servo sectors or "wedges" disposed on the disk surface of disk 14. Based on this position information, a position signal is provided via preamplifier 22 and channel 26 to microprocessor 34 to provide a representative position of transducer head 20 relative to its associated disk surface of disk 14. Upon completion of a seek operation and the corresponding alignment of transducer head 20 over the target data track, a read or write command is executed to read data from or write data to the target data track.

Strain Transducer

A mechanical shock may be exerted on disk drive 1 during a write operation. A mechanical shock exerted on disk drive 1 causes a strain in HDA 10 which results in a shock wave propagating to components in HDA 10 as well as PCBA 12.

Referring to FIG. 1, HDA 10 includes a housing having a first surface area 108. Disk drive 1 includes a strain transducer 19 for producing strain signal 61 representing strain in first surface area 108 that is due to the mechanical shock exerted on disk drive 1. Strain transducer 19 includes a first electrode 104, a second electrode, and a volume of piezosensitive material 110 defining a second surface area. Suitably, the second electrode is first surface area 108 and piezosensitive material 110 is made of piezoelectric material. Alternatively, the second electrode is an electrode (such as 105 in FIG. 1b) that is deposited on piezosensitive material 110.

Piezosensitive material 110 is disposed between first electrode 104 and the second electrode (108 or 105), wherein first surface area 108 overlaps the second surface area of piezosensitive material 110. Suitably, strain transducer 19 includes means 106 (such as adhesive) for securing first electrode 104 and piezosensitive material 110 to first surface area 108 of HDA 10 such that the strain in first surface area 108 is replicated in piezosensitive material 110. Preferably, first electrode 104 produces strain signal 61 responsive to the strain replicated in piezosensitive material 110.

Disk drive 1 includes means (such as shock detection circuit 57 and controller 32) responsive to strain signal 61 for controlling the write operation. For example, the write operation is suspended when strain signal 61 exceeds a threshold level.

Preferably, piezosensitive material 110 is a piezoelectric material containing poled polyvinylidene fluoride. Other thermoplastic piezoelectric polymers that can be poled include copolymers of vinylidene fluoride and trifluoroethylene, copolymers of vinylidene fluoride and tetrafluoroethylene and copolymers of vinylidene cyanide and vinyl acetate. Alternatively, piezo sensitive material 110 includes a piezoelectric ceramic or a piezoresistive material. Pieozelectric ceramics can include lead zirconate titanate, lead metaniobate, barium titanate and strontium titanate.

Figure 1A:
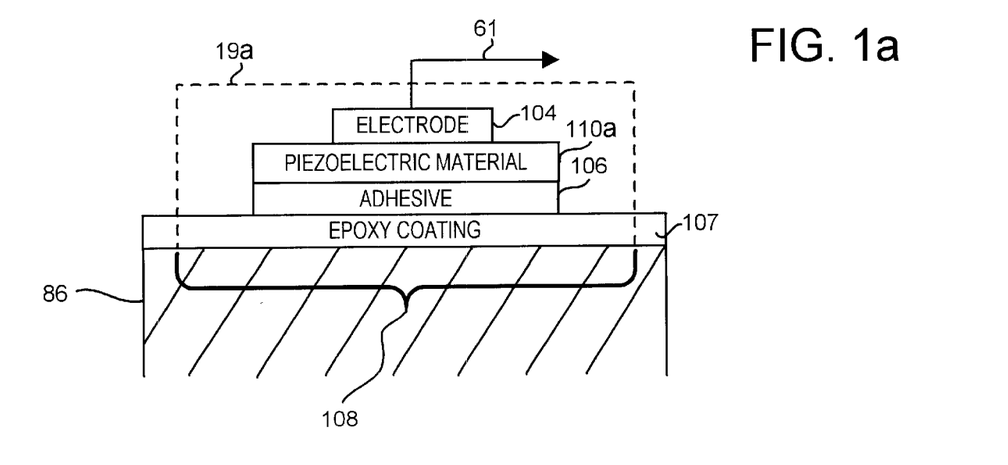
FIG. 1a is a block diagram of the strain transducer of FIG. 1 including a piezoelectric material.

Referring to FIG. 1a, HDA 10 includes housing 86 having first surface area 108. Strain transducer 19a includes a piezoelectric material 110a disposed between first electrode 104 and the second electrode. In this embodiment, the second electrode is first surface area 108 of housing 86. Suitably, first electrode 104 is deposited on a top surface of piezoelectric material 110a. Strain transducer 19a includes adhesive 106 and epoxy coating 107 for securing first electrode 104 and piezoelectric material 110a to first surface area 108 such that strain in first surface area 108 is replicated in piezoelectric material 110a. Suitably, epoxy coating 107 is applied on the aluminum surface of housing 86 as a corrosion resistant material to prevent particle generation (debris) in HDA 10. According to an alternate embodiment, the second electrode (such as 105 in FIG. 1b) is deposited on a bottom surface of piezoelectric material 110a. In this alternate embodiment, adhesive 106 and epoxy coating 107 secure first electrode 104, piezoelectric material 110a, and the second electrode to first surface area 108 such that strain in first surface area 108 is replicated in piezoelectric material 110a.

Figure 1B:
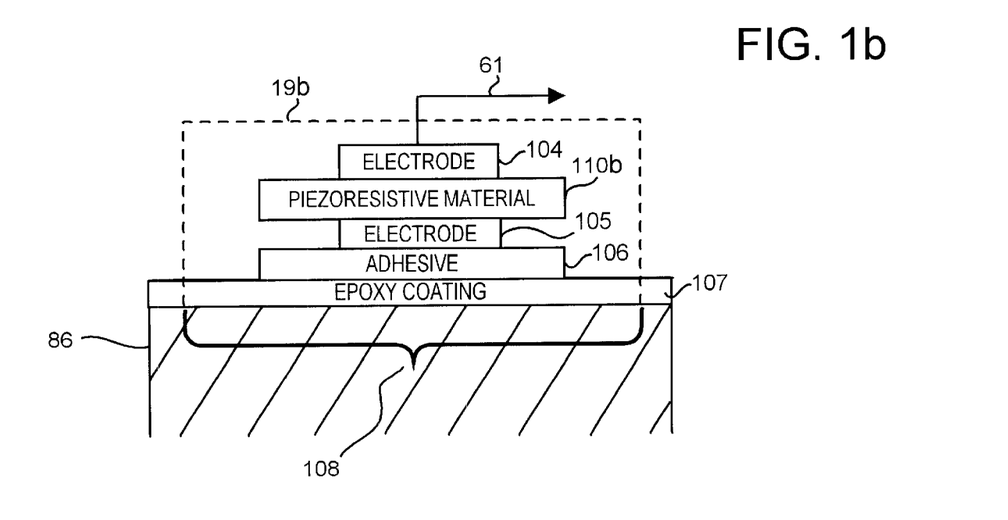
FIG. 1b is a block diagram of the strain transducer of FIG. 1 including a piezoresistive material.

Referring to FIG. 1b, HDA 10 includes housing 86 having first surface area 108. Strain transducer 19b includes a piezoresistive material 110b disposed between first electrode 104 and a second electrode 105. Strain transducer 19b includes adhesive 106 and epoxy coating 107 for securing first electrode 104, piezoresistive material 110b, and second electrode 105 to first surface area 108 such that strain in first surface area 108 is replicated in piezoresistive material 110b. In this embodiment, a bias current is applied to piezoresistive material 110b to measure change of resistance that depends on the replicated strain in piezoresistive material 110b. Suitably, first electrode 104 is deposited on a top surface of piezoresistive material 110b and second electrode 105 is deposited on a bottom surface of piezoresistive material 110b.

Referring to FIG. 1, PCBA 12 includes shock detection circuit 57 for comparing strain signal 61 to a shock threshold. The shock threshold represents a level of mechanical shock exerted on disk drive 1 that can cause relative movement (rapid displacement) between transducer head 20 and a track on disk 14 that exceeds a selected percentage of the track pitch from the track centerline. If strain signal 61 exceeds the shock threshold, shock detection circuit 57 asserts shock detect signal 62. When shock detect signal 62 is asserted during a write operation (while WGATE is asserted and transducer head 20 is writing data on the disk 14), HIDC 32 de-asserts WGATE signal 44a to inhibit transducer head 20 from writing data on the disk 14. Accordingly, the write operation is suspended or interrupted when strain signal 61 exceeds the shock threshold in order to prevent transducer head 20 from writing on an adjacent track.

Suitably, shock detect circuit 57 sends shock detect signal 62 directly to HIDC 62 to de-assert WGATE signal 44a. Alternatively, shock detect circuit 57 sends shock detect signal 62 to microprocessor 34. In this alternate embodiment, microprocessor 34 causes HIDC 32 to de-assert WGATE during a write operation when strain signal 61 exceeds the shock threshold.

Suspending the write operation might have caused a data block to be written only partially to a data sector. Accordingly, microprocessor 28 can perform a standard recovery procedure. Suitably, microprocessor 28 waits for a selected period to allow the shock to settle and then restarts the write operation to retry writing the data block.

Figure 2:
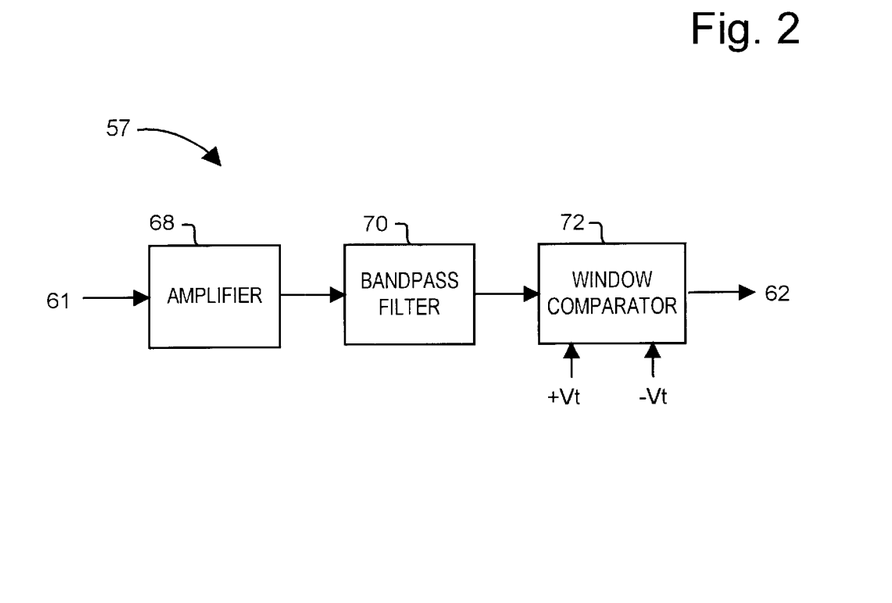
FIG. 2 is a block diagram of the shock detection circuit that is responsive to the strain signal generated by the strain transducer in FIG. 1.

FIG. 2 shows a block diagram of the shock detection circuit 57. Strain signal 61 is supplied to an amplifier 68 and then to a bandpass filter 70. Bandpass filter 70 removes high frequency noise from strain signal 61. Bandpass filter 70 also rejects low frequency responses that do not indicate mechanical shock. Suitably, the pass range of bandpass filter 70 is between about 200 Hz and about 10 KHz. The filtered signal is supplied to a window comparator 72, which determines whether the voltage of the filtered signal is between first and second thresholds +Vt and −Vt. If the voltage is above the first threshold +Vt or below the second threshold −Vt, window comparator 72 asserts shock signal 62.

The first and second thresholds +Vt, −Vt in window comparator 72 and gain of amplifier 68 are based on the mechanical characteristics of disk drive 1 and the electrical characteristics of strain transducer 19. For example, strain transducer 19 might generate 2 millivolts per g of acceleration, and a 20 g acceleration might cause transducer head 20 to deviate by more than ten percent of track pitch from centerline. Therefore, it might be desirable to trigger a shock fault when an acceleration of 5 g or greater is detected. If amplifier 68 has a programmable gain and the first and second thresholds +Vt and −Vt are fixed at +100 millivolts and −100 millivolts, respectively, amplifier 68 is programmed to have a gain of ten.

Figure 3:
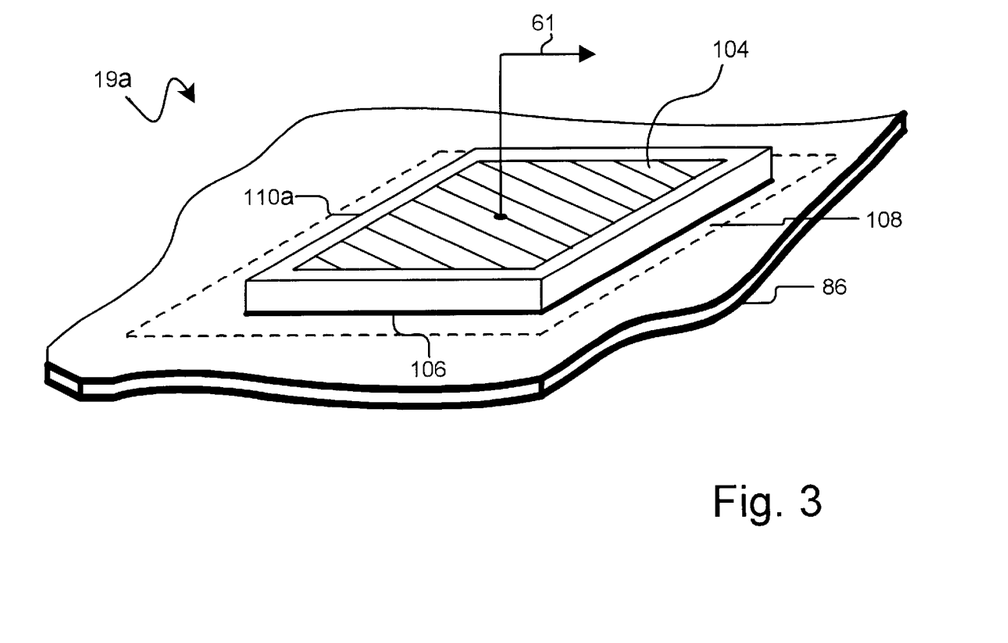
FIG. 3 is a diagram of the strain transducer of FIG. 1a secured to the head disk assembly of FIG. 1 according to an embodiment of the invention.

Referring to FIG. 3, HDA 10 includes housing 86 having first surface area 108. Strain transducer 19a includes first electrode 104, a second electrode, and piezoelectric material 110a defining a second surface area. In FIG. 3, the second electrode is first surface area 108. Suitably, piezoelectric material 110a is made of a poled piezoelectric polymer or ceramic material. Piezoelectric material 110a is disposed between first electrode 104 and first surface area 108, wherein first surface area 108 of HDA 10 overlaps the second surface area of piezoelectric material 110a. Strain transducer 19a includes adhesive 106 for securing first electrode 104 and piezoelectric material 110a to first surface area 108 of housing 86 such that strain in first surface area 108 is replicated in piezoelectric material 110a. Strain transducer 19a generates strain signal 61 representing strain in first surface area 108 due to the mechanical shock on disk drive 1.

PCBA 12 includes a conductor for transmitting strain signal 61 from strain transducer 19a to shock detection circuit 57. Suitably, first electrode 104 includes a conductor, such as a spring contact that is mounted on PCBA 12, for transmitting strain signal 61 to shock detection circuit 57.

Figure 4:
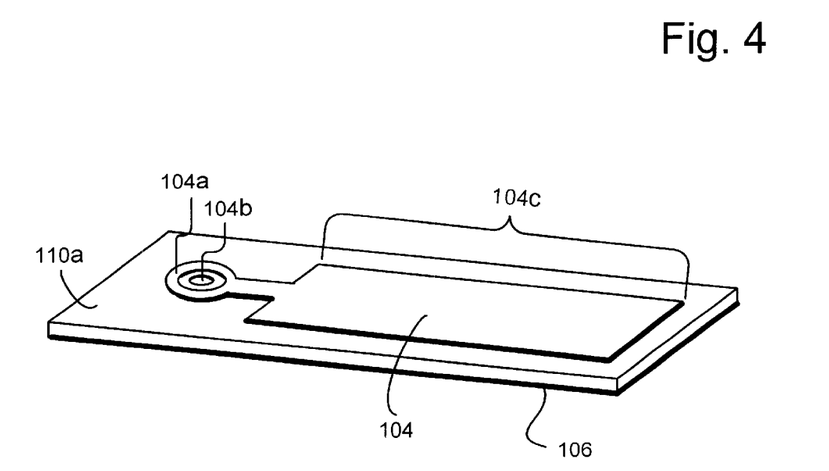
FIG. 4 is a diagram showing a portion of the strain transducer of FIG. 1a according to another embodiment of the invention.

Referring to FIG. 4, piezoelectric material 110a is shown having a rectangular shape (elongated strip) according to an embodiment of the invention. Suitably, piezoelectric material 110a is made of poled polyvinylidene fluoride. First electrode 104 is deposited on a surface of piezoelectric material 110a. First electrode 104 is shown having a pad land 104a, an aperture 104b, and a tail 104c extending from pad land 104a. Piezoelectric material 110a, on the opposite side from first electrode 104c, has a pressure sensitive adhesive 106 to facilitate installation on first surface area 108 of housing 86. Exemplary dimensions of piezoelectric material 110a of FIG. 4 include a width of approximately 0.375 inches and a length of approximately 2.0 inches.

Figure 5:
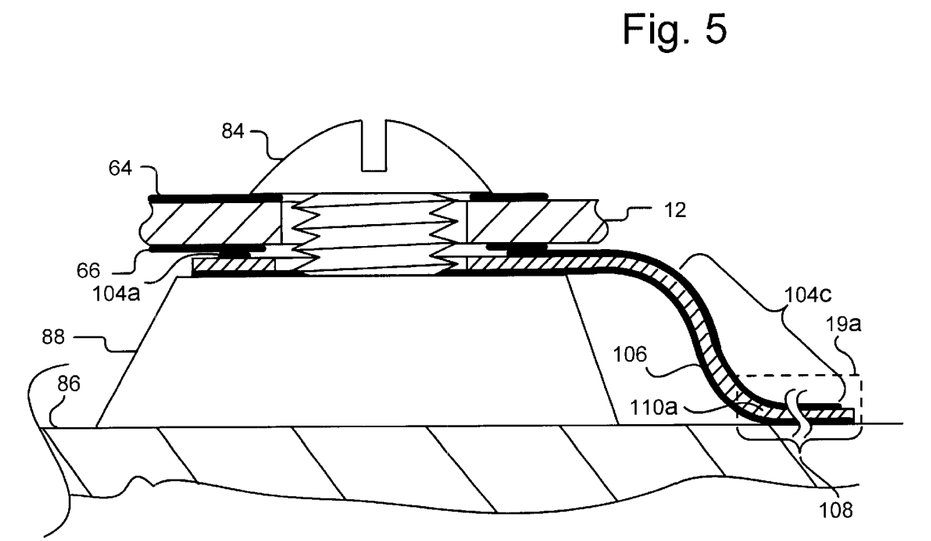
FIG. 5 is a cross-sectional view of the portion of the strain transducer of FIG. 4 secured to the head disk assembly.

Referring to FIG. 5, strain transducer 19a includes piezoelectric material 110a of FIG. 4 disposed between first electrode 104c and a second electrode. In this embodiment, the second electrode is first surface area 108 of housing 86. First surface area 108 overlaps a second surface area of piezoelectric material 110a.

Adhesive 106 secures first electrode (tail portion) 104c and underlying piezoelectric material 110a to first surface area 108 of housing 86 such that strain in first surface area 108 is replicated in piezoelectric material 110a. Suitably, a portion of piezoelectric material 110a and first electrode 104 are disposed between PCBA 12 and a mounting boss 88 on housing 86. First electrode pad land 104a is placed in electrical contact with a strain signal trace (conductor) 66 on a lower surface of PCBA 12. First electrode aperture 104b allows mounting screw 84 to extend through pad land 104a and piezoelectric material 110a. Pad land 104a has an inner diameter so as not make electrical contact with mounting screw 84. This allows strain signal trace 66 to conduct strain signal 61 from first electrode 104c to shock detection circuit 57. Mounting screw 84, which is secured to mounting boss 88, is placed in electrical contact with a ground trace 64 on an upper surface of PCBA 12, thereby forming a return path from the shock detection circuit 57 to the ground trace 64 to the mounting screw 84 to the mounting boss 88, and to first surface area 108.

When disk drive 1 receives a mechanical shock, a shock wave is propagated from first surface area 108 of housing 86 to piezoelectric material 110a. The shock wave causes a strain in piezoelectric material 110a that replicates the strain in first surface area 108. The strain causes a voltage to be generated on opposing faces of the piezoelectric material 110a. The voltage on one face is picked up by first electrode 104 and the ground provided by first surface area 108 (second electrode) of housing 86 provides the path to the other face of piezoelectric material 110a. Resulting is first electrode 104 producing strain signal 61 that is transmitted by the strain signal trace 66 to shock detection circuit 57. Even if a portion of the piezoelectric material 110a below the pad land 104a is crushed and depolarized (perhaps caused by overtorquing mounted screw 84), strain transducer 19a of FIG. 5 will still be functional. The uncrushed portion of piezoelectric material 110a will still generate a voltage in proportion to strain. Although the depolarized portion will not be able to sense the strain, pad land 104a will still be able to conduct strain signal 61 from tail 104c of first electrode 104 to strain signal trace 66 on PCBA 12.

The geometry and dimensions of tail 104c and piezoelectric material 110a can be selected to optimize the sensitivity of strain transducer 19a to the magnitude and direction of strain in first surface area 108 of housing 86.

In accordance with another invention made by the inventors hereof, HDA 10 includes housing 86 having a major surface extending in a first plane. PCBA 12 extends in a second plane parallel to the first plane. A volume of piezosensitive material 110 is positioned between the first and second planes. The piezosensitive material 110 undergoes a variable extent of strain. Disk drive 1 includes means for producing an electrical analog signal having a magnitude that represents the extent of strain in piezo sensitive material 110. Disk drive 1 further includes supporting means for positioning piezosensitive material 110 such that when disk drive 1 undergoes a mechanical shock, piezosensitive material 110 undergoes a change in the extent of its strain. The extent of strain is caused by a relative force between PCBA 12 and HDA 10. The supporting means includes means for causing the extent of the strain in piezosensitive material 110 to be controlled by the relative force between PCBA 12 and HDA 10.

For example, a strain transducer includes piezosensitive material 110 disposed between PCBA 12 and HDA 10. A first electrode can be deposited on one surface (such as top surface) of piezosensisitive material 110 or provided on PCBA 12. A second electrode can be deposited on another surface (such as bottom surface) of piezosensitive material 110 or provided by a surface area of HDA 10 (such as a surface area of housing 86). Suitably, HDA 10 includes a mounting surface (such as mounting boss 88 or other surface area of housing 86) and mounting means (such as mounting screw 84 and a mounting washer 161 of FIGS. 7a and 8) for securing piezosensitive material 110 between PCBA 12 and the mounting means of HDA 10 such that relative force between PCBA 12 and HDA 10 generates strain in piezosensitive material 110. Strain transducer 110 generates strain signal 61 that is an electrical analog signal having a magnitude that represents the extent of strain in the piezosensitive material 110.

Figure 6:
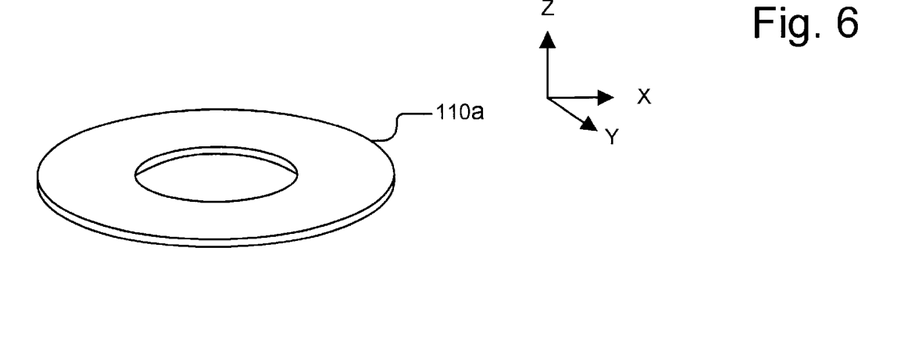
FIG. 6 is a diagram of a piezosensitive material having a washer configuration.

Referring to FIG. 6, piezoelectric material 110a is shown having the shape of a round washer with an inner diameter, an outer diameter and a given thickness. Exemplary dimensions of piezoelectric material 110a of FIG. 6 include a thickness of between approximately 30 microns and 110 microns, an inner diameter of approximately 0.125 inches and an outer diameter of approximately 0.375 inches. Suitably, piezoelectric material 110a of FIG. 6 is made of a thermoplastic polymer such as polyvinylidene fluoride, which is sold under the registered trademark KYNAR®. A ribbon or ribbonous sheet of polyvinylidene fluoride is stretched to align its molecule chains. The stretched ribbon is heated near the Curie temperature of the polyvinylidene fluoride and then corona charged using a corona brush. The corona charging causes the molecule chains to rotate and line up such that dipole layers are formed, whereby positive and negative charges are separated by a small distance. The ribbon is then cooled to room temperature, whereby the dipole layers become fixed. This process is known as "poling." Piezoelectric material 110a has a shape of a round washer that is suitably punched out of the ribbon made of poled polyvinylidene fluoride.

When piezoelectric material 110a is compressed in the z-direction or placed in tension in the z-direction, the charges are moved closer together or farther apart. The resulting charge displacement generates a voltage on the faces of piezoelectric material 110a. When piezoelectric material 110a is stretched in either the x-direction or the y-direction, piezoelectric material 110a becomes thinner in the z-direction. Consequently, the charges are moved closer together, and the resulting charge displacement gives a voltage on the faces of the Piezoelectric material 110a.

Figure 7A:
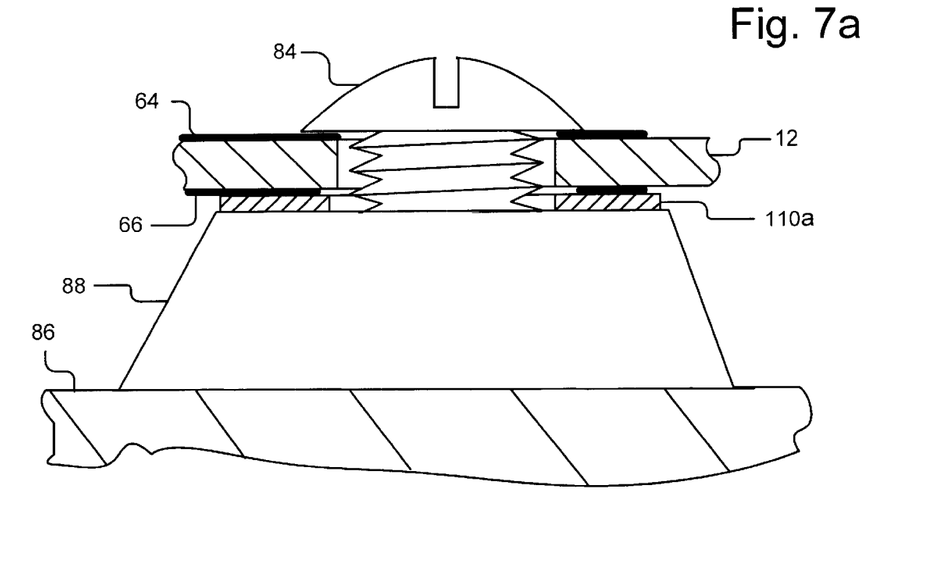
FIG. 7a is a cross-sectional view of a strain transducer including the piezosensitive material of FIG. 6 captured between the printed circuit board assembly and a mounting surface of the head disk assembly.

FIG. 7a shows how piezoelectric material 110a shown in FIG. 6 can be disposed between PCBA 12 and mounting boss 88 on housing 86 of HDA 10 such that relative force between PCBA 12 and HDA 10 generates strain in piezoelectric material 110a. Suitably, the mounting means of HDA 10 includes mounting screw 84 for clamping PCBA 12 and piezoelectric material 110a to the mounting boss 88 and, therefore, to housing 86. Resulting is a compressive force on piezoelectric material 110a. The compressive force should prevent slippage between piezoelectric material 110a and PCBA 12. However, the compressive force should not crush and depolarize piezoelectric material 110a. The area of mounting boss 88 and the area of piezoelectric material 110a can be increased to provide a crush safety factor of 2:1.

Figure 7B:
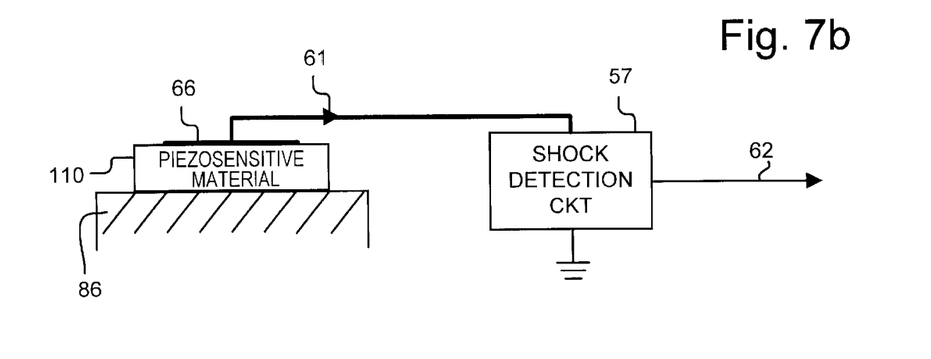
FIG. 7b is a diagram of the strain transducer of FIG. 6 coupled to the shock detector circuit in the printed circuit board assembly.

Referring to FIGS. 7a and 7b, a strain signal trace (conductor) 66 on a lower surface of PCBA 12 makes electrical contact with an upper surface of piezoelectric material 110a. Strain signal trace 66 conducts strain signal 61 from piezoelectric material 110a to shock detection circuit 57.

As shown in FIG. 7a, a lower surface of piezoelectric material 110a makes electrical contact with mounting boss 88. A ground trace 64 on an upper surface of PCBA 12 makes electrical contact with mounting screw 84. Resulting is a return path from shock detection circuit 57 to ground trace 64, to mounting screw 84, to mounting boss 88, and to piezoelectric material 110a.

Ground trace 64 and strain signal trace 66 are both etched onto PCBA 12. The traces 64 and 66 can be made of copper having a thickness of about 0.5 mils to about two mils.

When a mechanical shock (rotational or linear) is exerted on disk drive 1, a shock wave is propagated to housing 86 of HDA 10. The shock wave causes a strain in HDA 10 which results in relative motion between mounting boss 88 of HDA 10 and PCBA 12. This relative motion creates a strain in piezoelectric material 110a. Resulting is a charge displacement in piezoelectric material 110a, which causes piezoelectric material 110a to generate a voltage on its faces. The level of voltage is proportional to the charge displacement, which is proportional to the strain in piezoelectric material 110a, which is proportional to acceleration caused by the shock wave. Thus, the voltage generated by piezoelectric material 110a is a measurement of the shock in housing 86 of HDA 10.

Figure 8:
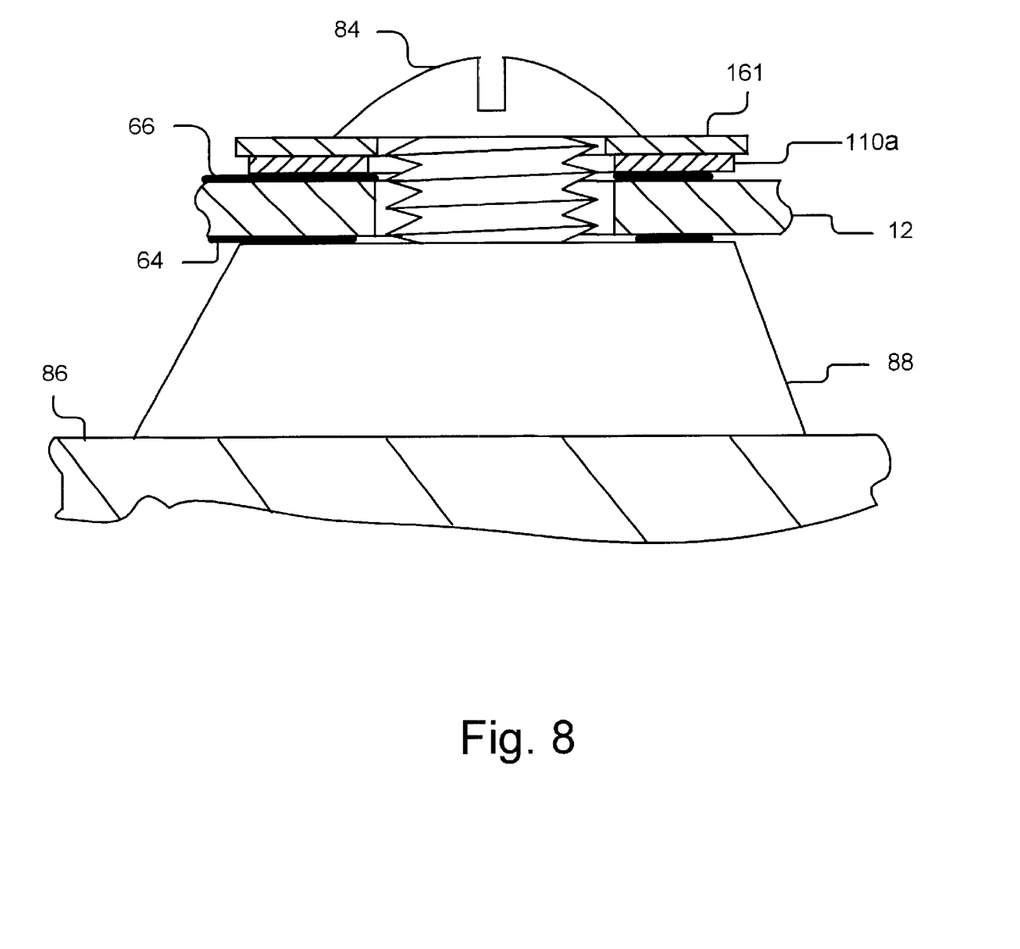
FIG. 8 is a cross-sectional view of a strain transducer having piezosensitive material captured between the printed circuit board assembly and a mounting screw and washer.

Referring to FIG. 8, piezoelectric material 110a shown in FIG. 6 is disposed between PCBA 12 and the mounting means (such as mounting screw 84 and mounting washer 161) of HDA 10 such that relative force between PCBA 12 and HDA 10 generates strain in piezoelectric material 110a. Mounting washer 161 is a metal washer. PCBA 12 includes strain signal trace 66 on its upper surface and ground trace 64 on its lower surface. A lower surface of piezoelectric material 110a makes electrical contact with the strain signal trace 66. An upper surface of piezoelectric material 110a makes electrical contact with mounting washer 161. Resulting is a ground path from shock detection circuit 57, to ground trace 64, to mounting boss 88, to mounting screw 84, to mounting washer 161, and to piezoelectric material 110a.

Figure 9:
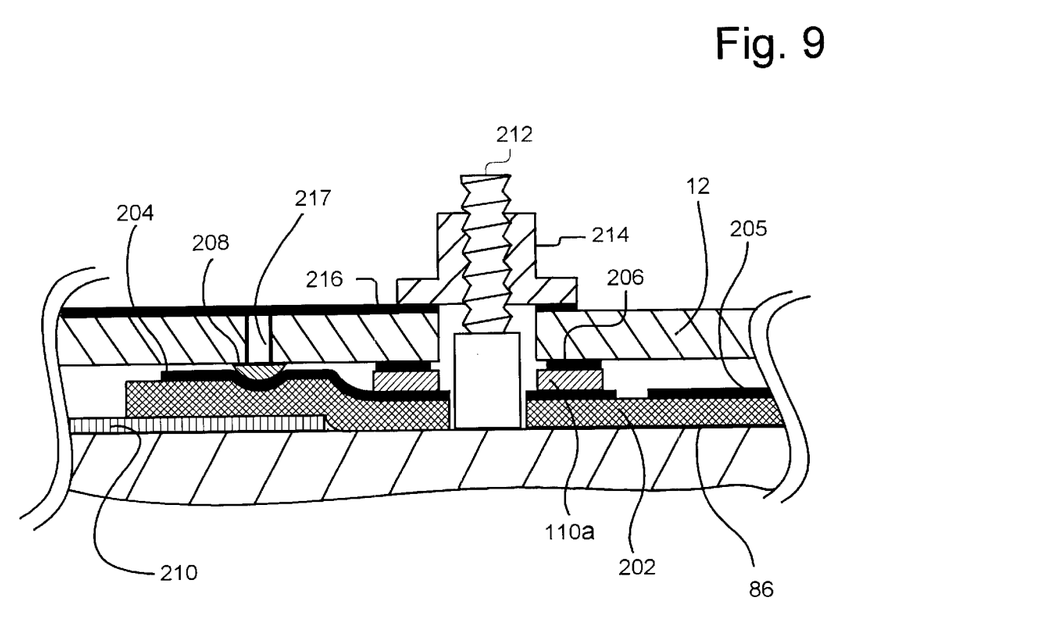
FIG. 9 is a cross-sectional view of a strain transducer having piezosensitive material captured between the printed circuit board assembly and the head disk assembly.

FIG. 9 shows piezosensitive material 110a of FIG. 6 secured to housing 86 of HDA 10 and placed between PCBA 12 and a flex cable 202. The piezoelectric material 110a is placed in contact with a signal ring 206 (such as signal trace 66 of FIGS. 7a and 8) on an underside of PCBA 12. Signal ring 206 supplies strain signal 61 from piezoelectric material 110a to shock detection circuit 57.

Figure 10:
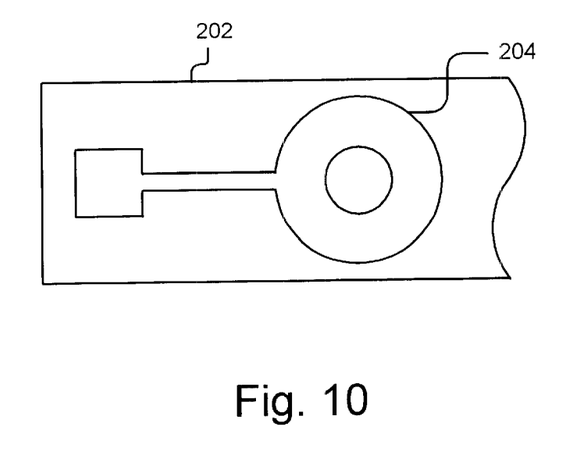
FIG. 10 is an illustration of a portion of a flex cable shown in FIG. 9.

Flex cable 202 includes a power trace 205 for supplying power from PCBA 12 to spindle motor 16. Flex cable 202 also provides a ground path 204 (such as ground trace 64 of FIGS. 7a and 8) for piezoelectric material 110a. Referring to FIG. 10, ground path (ring) 204 on flex cable 202 is placed in contact with piezoelectric material 110a. Solder dot 208 on PCBA 12 make electrical contact with ground path (ring) 204. A Kapton insulator shim 210 biases flex cable 202 against solder dot 208 to ensure a good electrical connection between ground path (ring) 204 and solder dot 208. Solder dot 208 is connected to ground by means of via 217 in the PCBA 12 which allows the solder dot 208 to be connected to the ground trace 216.

A mounting stud 212 extends upward from a mounting surface of the housing of HDA 10. The mounting stud 212 extends through the flex cable 202, piezoelectric material 110a and PCBA 12. A threaded end of the mounting stud 212 is engaged by a flange nut 214. A ground trace 216 on an upper surface of the PCBA 12 is placed in electrical contact with the flange nut 214, thereby establishing a path from the piezoelectric material 110a to ground.

We claim:

1. A disk drive being subject to a mechanical shock during a write operation in the disk drive, the disk drive comprising:
   - a head disk assembly having a housing including a first surface area;
   - a strain transducer for producing a strain signal representing strain in the first surface area due to the mechanical shock, the strain transducer comprising:
   - a first electrode;
   - a second electrode;
   - a volume of piezosensitive material defining a top surface, a bottom surface and a second surface area, the piezosensitive material being disposed between the first electrode and the second electrode such that the first electrode is deposited on the top surface and the second electrode is deposited on the bottom surface, wherein the first surface area overlaps the second surface area, the first electrode and the piezosensitive material being secured to the first surface area such that the strain in the first surface area is replicated in the piezosensitive material, and
   - means responsive to the strain signal for controlling the write operation in the disk drive.

2. The disk drive of claim 1 wherein the first electrode is deposited on the piezosensitive material.

3. The disk drive of claim 1 wherein the piezosensitive material is a piezoelectric material.

4. The disk drive of claim 1 wherein the piezosensitive material is a piezoresistive material.

* * * * *